United States Patent
Rubin et al.

[11] 3,906,475
[45] Sept. 16, 1975

[54] POWDER LEVEL MONITOR

[75] Inventors: Jacob C. Rubin, Fairport; John P. Swapceinski, Bergen, both of N.Y.

[73] Assignee: Eastman Kodak Company, Rochester, N.Y.

[22] Filed: May 16, 1974

[21] Appl. No.: 470,411

[52] U.S. Cl. .................................. 340/246; 222/23
[51] Int. Cl.² ........................................ G08B 21/00
[58] Field of Search .......... 340/244, 246; 73/290 V; 222/23

[56] References Cited
UNITED STATES PATENTS

| | | | |
|---|---|---|---|
| 2,774,959 | 12/1956 | Edelman et al. | 340/246 X |
| 3,017,771 | 1/1962 | Bonhomme | 73/290 V |
| 3,079,596 | 2/1963 | Atkinson | 340/244 R |

FOREIGN PATENTS OR APPLICATIONS
202,228  2/1966  Sweden ............................ 73/290 V Primary Examiner—John W. Caldwell
Assistant Examiner—Daniel Myer
Attorney, Agent, or Firm—T. H. Close

[57] ABSTRACT

An apparatus for monitoring the level of finely powdered material within a hopper. A microphone disposed within the hopper monitors the environmental noise at a particular level within the hopper. Circuitry associated with the microphone is responsive to a marked change in the detected level of environmental noise for activating a powder level indicator when the level of powder in the hopper rises above or falls below the face of the microphone.

5 Claims, 2 Drawing Figures

POWDER LEVEL MONITOR

BACKGROUND OF THE INVENTION

1. Field of the Invention

This invention relates to apparatus for monitoring the level of powder within a hopper and in particular to such apparatus operating on acoustic principles. More specifically this invention relates to acoustic powder-level sensing apparatus using environmental noise as a signal source.

2. Description of the Prior Art

Many industrial processes involve the collection or dispensing of various fine powders or dusts in or from variously-shaped hoppers. Frequently the processes involve the need to perform a specific function when the level of powder or dust reaches, exceeds, or drops below a particular pre-set level. This level may be determined when the hopper is initially installed or it may be desirable to re-set the level with a minimum delay and without disassembly of the hopper to meet new process requirements. To initiate these functions automatically, a reliable and readily adjustable powder level monitor is needed.

Prior art material level sensors operating on optical principles have proven unsatisfactory because of the tendency of the optics to become covered and obscured in the dusty environment. Mechanical sensors have also proved to be unreliable and susceptible to fouling in the dust environment. The prior art material level sensors which have proven most satisfactory to measure the level of powder in a container have been those operating on acoustic principles. These prior art acoustic powder-level sensors utilize a transducer as a source of acoustic signals. They detect the signal with a microphone which is coupled to a threshold detecting circuit. These devices operate on the principle that when powder is present in an acoustical path between the transducer and the microphone then the detected signal will be attenuated. The effectiveness of these prior art acoustical devices is limited by the fact that they are susceptible to environmental noise and are therefore most reliable when their environment is relatively quiet. This is a serious drawback especially when the hopper containing the powder is mounted on a relatively noisy machine or is in an industrial environment where machines produce a high level of background noise.

Another shortcoming of these prior art acoustical powder-level sensors is that they have proven to be awkward to adjust when the level being sensed is desired to be changed. This has been due to their relatively complicated nature which also makes them expensive to manufacture.

SUMMARY OF THE INVENTION

It is therefore an object of this invention to provide an improved apparatus for acoustical powder-level sensing.

Another object of this invention is to provide an acoustic powder-level sensing apparatus which is not adversely affected by background noise.

A further object of this invention is to provide an acoustic powder-level sensing apparatus which is less complicated and therefore less expensive than those of the prior art.

A still further object of this invention is to provide an acoustic powder-level sensing apparatus which is easily adjustable to respond to the presence or absence of powder at different levels within a container.

These and other objects are attained in accordance with the present invention wherein there is provided a microphone disposed within the powder-containing hopper at the level at which the presence or absence of powder is to be measured. The microphone is held in place by a support structure and is responsive to the environmental noise transmitted through the hopper to its interior to produce a signal having a component proportional to at least one characteristic of the environmental noise which varies with the presence or absence of powder at that level. The microphone is connected to a powder-level indicator which responds to the value of the component of the signal produced by the microphone to indicate the presence or absence of powder at the level of the microphone within the hopper.

According to a preferred embodiment of the invention, the microphone is a directional microphone which is supported on the end of a calibrated plastic rod. The rod projects through a hole in the top of the hopper and is held in place by a suitable clamp which allows the rod to be adjusted to determine the level of the microphone in the hopper. The microphone has one active face that is positioned at the level at which the presence or absence of powder is to be monitored. According to this preferred embodiment, the signal produced by the microphone has a component which is proportional to the amplitude of the environmental noise. The powder-level indicator responds to a decrease in the amplitude of the environmental noise to indicate that the powder level has fallen below the active face of the microphone.

In a further refinement of the preferred embodiment, the powder-level indicator is responsive to only a portion of the range of frequencies present in the signal from the microphone.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
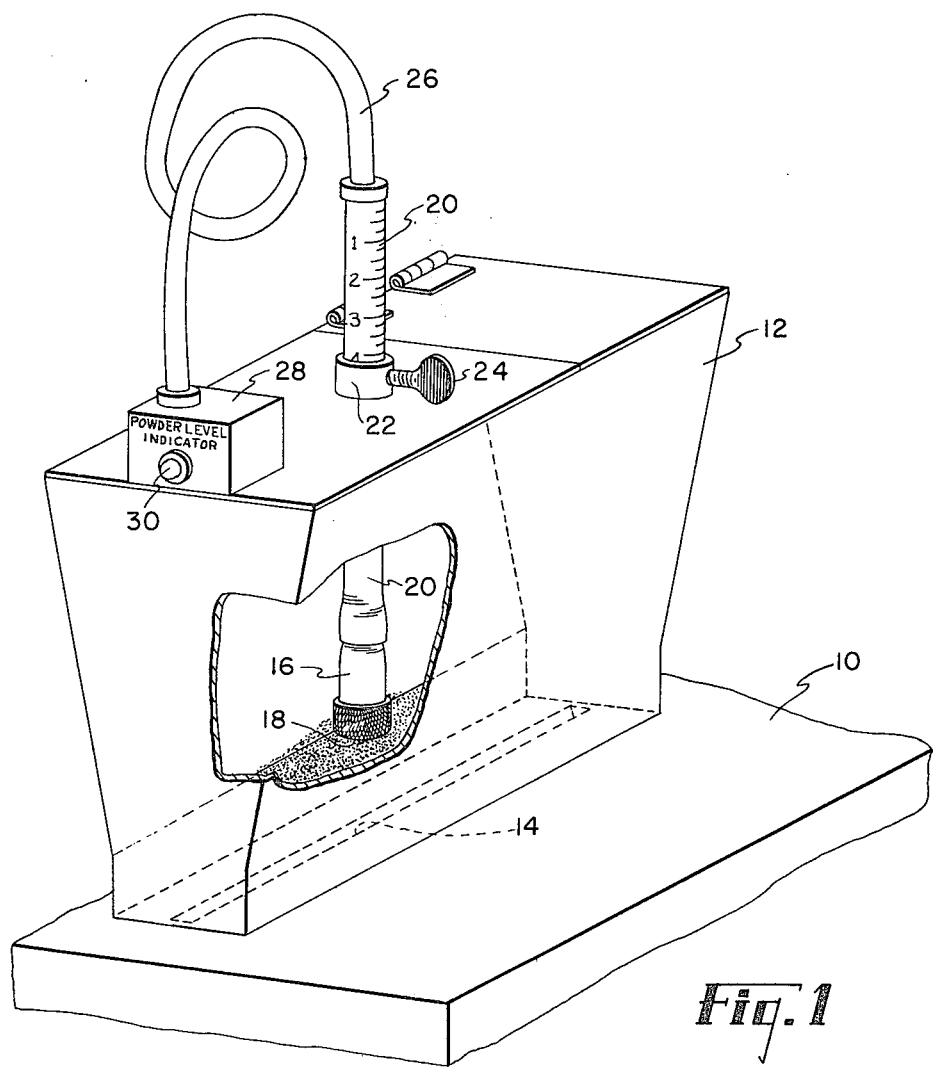
FIG. 1 shows a partially broken away view of a hopper in which one embodiment of the invention is installed.

FIG. 1 shows a typical installation of an embodiment of the subject invention in a machine 10, only partly shown, which uses a fine powder or dust in performing its function. A hopper 12 for containing the powder is mounted on the machine. Means shown as a slit 14 (shown in phantom) in the bottom of the hopper are provided for metering the powder from the hopper into the machine.

According to the invention a directional microphone 16 is suspended within the hopper so that the active face 18 of the microphone is positioned at the level at which the presence or absence of powder is to be monitored.

The microphone is supported and positioned within the hopper by a calibrated plastic rod 20 which enters the hopper through a hole in the top cover. Suitable means are provided such as the collar 22 and the set screw 24 for adjustably holding the plastic rod in position. The calibration on the plastic rod serves to indicate the position of the face of the microphone in the hopper. The plastic rod also provides protection for the microphone output cable 26 in addition to acoustically isolating the microphone from the external environment.

The microphone is connected via the microphone output cable to a powder level indicator comprising a sonic level detector circuit 28 and an indicator lamp 30.

The principle of operation of the subject invention is based on the discovery that a fine powdery dust increases the acoustic transmission of environmental noise compared to the transmission of environmental noise through air. Hence, a microphone immersed in the powder will be subjected to a much higher level of environmental noise than a microphone situated above the powder. For example, in one experiment the detected environmental noise due to the operation of the associated machinery fell from 90 d.b. when the microphone was below the powder to 70 d.b. when the microphone was above the powder. This phenomenon was unexpected since a study of the prior art acoustic powder level sensors suggested that a signal passing through the powder would be attenuated.

Figure 2:
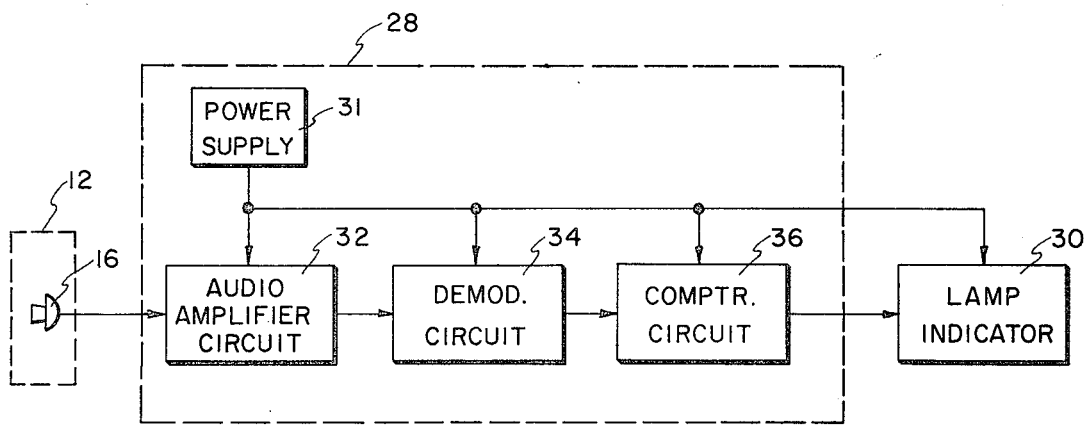
FIG. 2 is a block diagram showing the elements of the sonic level detector circuit.

The microphone and associated sonic level detector unit sense this change in the detected level of environmental noise and indicate via the indicator lamp 30 that the powder level is low, i.e., it is below the active face of the microphone. A block diagram of the sonic level indicator unit is shown in FIG. 2. The sonic level detector unit 28 comprises a power supply 31 which powers an audio amplifier 32, a de-modulator circuit 34, and a comparator circuit 36. The power supply also powers the indicator lamp 30. These circuits are all well known in the art, and therefore a detailed description of each circuit is not deemed necessary for an understanding of the invention.

In operation, the directional microphone 16 is connected to the audio amplifier circuit 32 which produces an amplified voltage signal proportional to the noise level at the microphone. The thus amplified signal is applied to de-modulator circuit 34 where the signal is rectified and converted to a dc-level which will vary with the amplitude of environmental noise detected by the microphone. The de-modulator circuit 34 is coupled to the comparator circuit 36 which compares the dc-level produced by the de-modulator circuit to a pre-selected reference voltage. When the dc-level falls below the pre-selected reference voltage the comparator circuit activates the indicator lamp 30 which signals the operator or the machinery that the powder in the hopper is below the face of the microphone.

It was also discovered that the dominant frequency components of the environmental noise under the powder differed measurably from the dominant frequencies above the powder. In one experiment, the dominant frequency components of the signal when the microphone was covered with powder were in the 100 to 150 Hertz range. When the microphone was uncovered, the dominant frequencies were 60 Hertz and 2 Kilohertz. This phenomenon can be used to advantage in improving the sensitivity of the apparatus. In the preferred embodiment, the audio amplifier 32 was designed to respond optimally to the 100 to 150 Hertz components of the signal. In this way the shift in dominant frequencies of the signal was used to assist in discriminating between the condition where powder was covering the microphone and the condition where the microphone was uncovered.

It should be noted that the dominant frequencies of the environmental noise depend entirely upon the types of noise generators which are in the vicinity of the hopper. A person skilled in the art can easily measure the dominant frequency components of the environmental noise detected under the powder in the hopper and design the amplifier circuit to respond optimally to these frequencies.

The invention has been described in detail with particular reference to preferred embodiments thereof, but it will be understood that variations and modifications can be effected within the spirit and scope of the invention.

We claim:

1. Apparatus for monitoring the presence or absence of powder at a predetermined level within a hopper, said hopper being located in a noisy environment, said apparatus consisting of:
   a. a microphone disposed at a predetermined level within the hopper and responsive to environmental noise transmitted through the hopper to the interior thereof to produce a signal having a component proportional to the amplitude of the environmental noise at the predetermined level within the hopper;
   b. means for supporting said microphone at said predetermined level within the hopper; and
   c. means coupled to said microphone and responsive to a decrease in the amplitude of said signal for indicating the absence of powder at the predetermined level within the hopper.

2. The apparatus of claim 1 wherein said means for supporting said microphone is adjustable to support said microphone at a range of predetermined levels within the hopper.

3. The apparatus of claim 2 wherein the hopper includes a cover having a hole therein and said means for supporting said microphone comprises:
   a. a plastic rod having an end portion and a calibrated portion along the length thereof, said plastic rod being disposed generally vertically through the hole in the cover of the hopper so that at least a part of said calibrated portion extends above the cover of the hopper and said end portion extends into the hopper, said microphone being attached to said end portion of said plastic rod; and
   b. means for adjustably clamping said plastic rod at a desired extension into the hopper, whereby the level at which said microphone is disposed within the hopper is predetermined.

4. The apparatus of claim 1 wherein said microphone is a directional microphone having an active face, said active face being positioned at the predetermined level within the hopper at which the presence or absence of powder is monitored.

5. The apparatus of claim 1 wherein said signal also contains a range of frequency components and wherein said indicating means responds optimally to only a portion of said range of frequencies.

* * * * *